INVENTOR.
CHARLES J. YOUNGBLOOD, Jr.
BY Paul S. Bolger
ATTORNEY

United States Patent Office 3,185,034
Patented May 25, 1965

3,185,034
PATTERNED GLASS
Charles J. Youngblood, Jr., Berkeley, Mo., assignor to Mississippi Glass Company, St. Louis, Mo., a corporation of New York
Filed Sept. 26, 1961, Ser. No. 140,832
3 Claims. (Cl. 88—60)

This invention relates to the type of flat glass commonly known as figured or patterned glass used for fenestration in buildings, for partitions in offices, for glazing door frames and other like applications. While the description of this invention is considered with respect to a configuration for glass sheets, such configurations may be used for plastic or sheets of other material.

It has been known in the past to provide glass surfaces which had been cut or rolled with patterns to present prismatic surfaces on at least one surface for the purpose of obscuring vision, diffusing light and to provide ornamentation. This invention is directed to improvements in figured glass which, in addition to presenting an ornamentally attractive appearance, serving to diffuse light and obscuring vision, also produces improved results.

It is an important object of this invention to provide an improved patterned glass which provides for the diffusion of light passing through the glass and gives an effect of alternate silvery and dark bands.

A further object of the invention is to provide a figured glass which may readily be cleaned and which may be economically produced.

The invention comprises at least one portion of a flat glass surface which has been formed with ridges and grooves therein. The included angle between the sides or slopes connecting the grooves and the ridges is in the order of or about 90 degrees so that light rays falling on the smooth surface of the glass sheet will be reflected from the patterned surface, producing a silvery effect. The invention more specifically includes a series of sawtooth ridges and valleys connected by straight sloping lines, the included angle of which sloping sides or lines is of the order of 90 degrees and wherein there are a plurality of portions of such patterned glass laid in angular relationship to similar portions to form various patterns of prisms, the effect of the angular displacement of the portions of glass causing patterns of light reflection.

Figure 1:
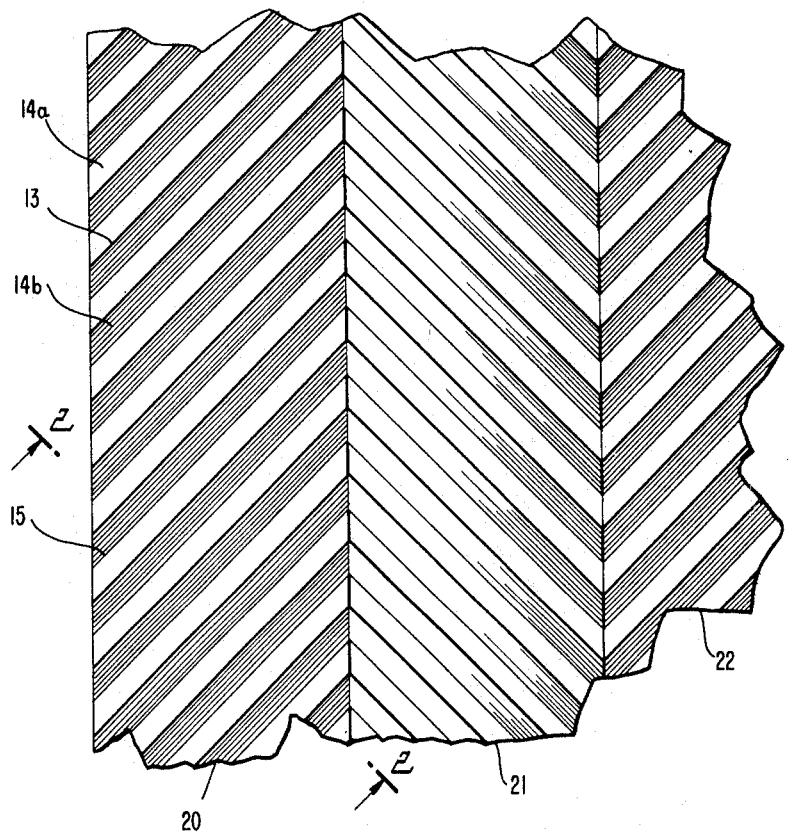
Figure 2:
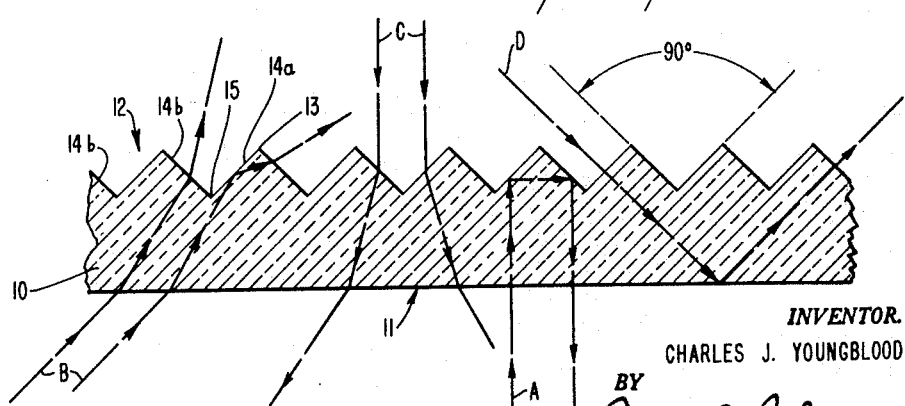

Reference is made to the drawings for a further description of the invention. The drawings include:

FIGURE 1, a plan view of one form of the invention of patterned glass; and
FIGURE 2, a cross-section taken along the line 2—2 in FIGURE 1.

Referring to FIG. 2, a glass or plastic sheet 10 may be formed with a flat surface or face 11 and with a ridged surface 12, the ridged surface being formed either by cutting, by rolling, or by pressing.

The ridged surface 12 is divided into peaks or ridges 13 and grooves or valleys 15 connected by sloping sides 14a and 14b. By forming the peaks and valleys with an included angle of the order of 90 degrees, a prismatic light reflecting effect is achieved in which a large amount of the light rays such as A which pass through the glass at an angle generally perpendicular to the plane of the surface 11 will be reflected at an angle perpendicular to the plane from the sloping surfaces 14a, 14b so that to a person viewing the surface 11 the sloping sides 14a and 14b would appear to be silvery in color, the glass surfaces thereby having a very pleasing ornamental effect. Whereas light rays such as B passing at other than normal incidence through the flat surface 11 of the glass sheet 10 when they emerge on the surface 12 will be diffused in a heterogeneous manner by the sloping sides 14a and 14b, providing for very satisfactory illumination.

As will be noted from FIG. 2, the ridges and valleys are of equal depth; however, it will be appreciated that the ridges and valleys can be of different depths providing the slopes connecting them are of the proper angular relation.

It will be understood that because of the light reflection and refraction there is obstruction of vision resulting from the ridged or pattern side 12 of the glass sheet 10. When light rays such as C are directed toward the ridge side 12 of the glass sheet, those rays which are normal to a plane parallel to surface 11 pass through the glass and emerge on the flat surface 11, providing diffused illumination on that side, whereas light rays such as D which are directed toward the ridge side 12 at an angle are reflected as illustrated in FIG. 2.

Referring to FIG. 1, it will be noted that the patterned glass of FIG. 2 is arranged in a strip 20 which is angularly disposed to a similarly ridged strip 21. A further strip 22 is angularly disposed with regard to strip 21, the latter strip having ridges and grooves parallel to those of strip 20. The strips are combined as shown in FIG. 1 to form a pattern. Other patterns may be defined by similar arrangements of glass strips or other geometric patterns of glass with the ridges and valleys 13 and 15 in various angular relationships to adjacent portions.

The angle of the pattern illustrated in FIG. 1 is 45 degrees to the edge of the strip, thus in the strips 20 and 21 the included angle between the abutting ridges in adjacent strips 20 and 21 is about 90 degrees. With a configuration shown in FIG. 1 which is formed by the ridges 13 and the valleys 15 with the sloping sides 14a and 14b, there is offered a design which presents rows or bands of prisms angularly disposed to each other which produces the effect of alternate silvery and dark bands.

In order to facilitate cleaning, it may be desirable that the depth of the pattern be relatively shallow. For this reason, it is preferred that the pitch or number of prisms in each band or strip 20, 21, 22 be in the order of 8 to 20 per lineal inch of band. With prisms, i.e., ridges, of this size the most attractive effect is obtained if the width of each strip be in the order of one-half to one and one-half inches. For different installations different sizes can be employed and the relations of the parts may be adjusted as desired.

It will be appreciated from the foregoing description that the invention provides an improved pattern glass which can be readily and economically produced and which will give a pleasing and decorative effect and desirable obscuration without any appreciable diminution of illumination through the glass panel.

What is claimed is:
1. A patterned glass sheet comprising one flat surface and a second surface formed to provide a series of adjacently disposed portions, each of portions having a plurality of ridges and grooves connected by flat sloping sides, with an included angle of the order of 90 degrees and with the ridges and grooves of each said portion of said second surface being uniformly angularly disposed relative to such ridges and grooves in each adjacent portion thereof to provide the effect of alternating relatively light and dark patterns regardless of the angle of view or the angle of light incident upon the glass.
2. A patterned glass having one flat surface and having a second surface formed of strips of ridged glass divided into peaks and valleys having sloping sides, the included angle between said sides being of the order of 90 degrees, the successive valleys and peaks being parallel to each other and at an angle to the edges of the strips and at an angle to the peaks and valleys of adjacent strips to pro- duce the effect of alternately silvery and dark strips regardless of the angle of view or the angle of light incident upon the glass.

3. A patterned glass having one flat surface and having a second surface formed of strips of ridged glass divided into peaks and valleys having sloping sides in each strip meeting at an included angle of about 90 degrees, the succesive valleys and peaks of each strip being parallel to each other and at an angle of about 90 degrees to the valleys and peaks of the next adjacent strip to provide the effect of alternately relatively light and dark strips regardless of the angle of view or the angle of light incident upon the glass.

References Cited by the Examiner
UNITED STATES PATENTS

| | | | |
|---|---|---|---|
| 570,446 | 11/96 | Bailey | 240—93 |
| 586,211 | 7/97 | Basquin | 88—60 |
| 586,217 | 7/97 | Basquin | 88—60 |
| 595,270 | 12/97 | Soper | 88—60 |
| 821,307 | 5/06 | Mygatt | 240—106 |

FOREIGN PATENTS

| | | |
|---|---|---|
| 362,998 | 7/06 | France. |
| 1,110,714 | 2/56 | France. |

JULIA E. COINER, *Primary Examiner.*